United States Patent [19]

Heasley

[11] 4,189,209
[45] Feb. 19, 1980

[54] RETROREFLECTOR OF INTEGRATED LIGHT REFLECTING UNITS OF VARYING CONFIGURATIONS

[75] Inventor: James H. Heasley, Shaker Heights, Ohio

[73] Assignee: Ferro Corporation, Cleveland, Ohio

[21] Appl. No.: 950,982

[22] Filed: Oct. 13, 1978

[51] Int. Cl.² ............................................. G02B 5/124
[52] U.S. Cl. ........................................ 350/103; 404/14
[58] Field of Search ................................. 350/97–105; 404/14–16

[56] References Cited

U.S. PATENT DOCUMENTS

| | | | |
|---|---|---|---|
| 1,671,086 | 5/1928 | Stimson | 350/103 |
| 3,332,327 | 7/1967 | Heenan | 350/103 |
| 3,392,639 | 10/1966 | Heenan et al. | 350/103 |
| 3,684,348 | 8/1972 | Rowland | 350/103 |
| 3,758,191 | 9/1973 | Hedgewich | 350/103 |
| 3,873,184 | 3/1975 | Heenan | 350/103 |
| 3,923,378 | 12/1975 | Heenan | 350/103 |
| 3,954,324 | 5/1976 | Arnott et al. | 350/97 X |
| 4,073,568 | 2/1978 | Heasley | 350/103 |
| 4,076,383 | 2/1978 | Heasley | 350/103 |

FOREIGN PATENT DOCUMENTS 1205150 9/1970 United Kingdom ........................ 350/103

Primary Examiner—John K. Corbin
Assistant Examiner—B. W. de los Reyes
Attorney, Agent, or Firm—Wilson, Fraser, Barker & Clemens

[57] ABSTRACT

A retroreflector and a process for preparing it are disclosed characterized in that the retroreflector has a retroreflecting area consisting of rows of integrated, trihedral, light-reflecting units of varying geometric configurations which are so arranged as to provide substantially the same wide angle response to incident light throughout the entire retroreflective area. Essentially, the widths of adjacent rows of trihedral, light-reflecting units vary to form a pattern which may be repeated throughout the retroreflective area.

19 Claims, 17 Drawing Figures

RETROREFLECTOR OF INTEGRATED LIGHT REFLECTING UNITS OF VARYING CONFIGURATIONS

BACKGROUND OF THE INVENTION

This invention relates to a retroreflector. In the usual practice, a series of light-reflecting units is disposed in an array which extends over an appreciable area of a retroreflector to provide a light-reflecting action. In prior light-reflecting arrays, the practice has been to make all of the light-reflecting units substantially of the same size and same geometric configuration. Patentability, in some instances, has been bottomed on the particular, uniform configuration used. Retroreflectors having light-reflecting units of substantially the same size and configuration are typified by the following U.S. Pat. Nos. 1,671,086 to Stimson; 3,332,327 to Heenan; 3,684,348 to Rowland; 3,758,191 to Hedgewick; and 3,923,378 to Heenan.

An array having light-reflecting units of substantially the same size and geometric configuration normally has maximum reflectivity in one particular direction, and the performance by the light-reflecting array falls off rapidly at other directions. However, there are many applications where appreciable retroreflection in only one particular direction is not desirable and, to the contrary, it becomes highly desirable to have reflectivity over a wide range of entrance angles for incident light which extends and is substantially uniform throughout the entire retroreflective area. In effect, the retroreflector ideally should reflect light approaching the retroreflector from all angles and possess this ability with little change for all portions of its retroreflective area.

It has previously been suggested to obtain wide angle response by tilting the axes of cube corners in two or more directions, either by dividing the retroreflector into sections or panels, each section having cube corners with one particular orientation differing from the cube corner orientation of the other sections; or by forming the light-reflecting units with a group of pins having individual cube axes pointing in different directions.

For example, U.S. Pat No. 3,954,324 to Arnott et al. illustrates the first-mentioned approach to solving the problem of a retroreflector which is retroreflective-responsive to incident light from widely differing incident angles. This patent discloses a retroreflector having a reflective wall of three portions, including a central portion and two side portions which project from opposite ends of the central portion. The latter has a plurality of conical reflector elements for reflecting incident light rays that are substantially parallel to a fore-and-aft axis of a housing for the reflective wall, such as a pavement marker, but which have relatively low optical efficiency for reflecting light rays making a substantial acute angle with respect to the fore-and-aft axis of the housing. The side portions of the reflective wall have reflector elements of a configuration other than conical and have less optical efficiency than the conical reflector elements for reflecting incident light rays that are in a horizontal plane parallel to the fore-and-aft axis but which have greater optical efficiency than the central portion for reflecting incident light rays that make a substantial acute angle with the plane of such fore-and-aft axis. Accordingly, while the three portions of the Arnott et al. reflective wall are collectively operable for incident light over a wide range of entrance angles, each of the three portions of the reflective wall is individually operative for only certain incident light for which the other two portions are substantially inoperative.

U.S. Pat. No. 3,926,402 to Heenan illustrates the second mentioned approach in which a set of pins is used to form a light-reflecting unit, the pins having individual axes pointing in different directions.

SUMMARY OF THE INVENTION

The principal object of the invention is to provide a retroreflector of relatively simple design which provides efficient retroreflectivity throughout its retroreflective area for a wide range of angles of incident light. This is accomplished by a retroreflecting array consisting of rows of integrated, trihedral, light-reflecting units of varying geometric configurations. The widths of adjacent rows of the light-reflecting units vary to form a pattern which may be repeated throughout the retroreflective area.

In one form, the present retroreflector comprises a light-transmitting body having a substantially smooth face defining a light-receiving surface and an opposite face having the array of substantially parallel rows of light-reflecting units which extends over an appreciable area of the opposite face. Each row comprises a plurality of juxtaposed, light-reflecting units. Each unit is formed from three mutually perpendicular facets forming a trihedral angle, each trihedral angle having three mutually perpendicular edges. Two of the three edges are disposed generally in the direction of a row, while the third edge is disposed generally transversely of the direction of the row.

The trihedral angles of the light-reflecting units of at least two appreciably adjacent rows have the same corresponding lengths for the two edges which are disposed generally in the direction of the rows, although such lengths within a given row may be different as between themselves. The edges disposed transversely of the rows of such two appreciably adjacent rows always have differing lengths. Preferably, the two edges that are disposed generally in the direction of a row are equal in length, and the ratio of the length of one of such two equal sides to the length of the transversely disposed third edge is different for such two adjacent rows.

The pattern created by two or more adjacent rows may be repeated throughout a substantial portion of the array, all of the rows preferably inter-nesting in side-by-side relation. In particular, the trihedral angles of adjacent rows of the array may inter-nest and be offset from each other in a direction along the rows.

DESCRIPTION OF THE PREFERRED EMBODIMENTS

Figure 1:
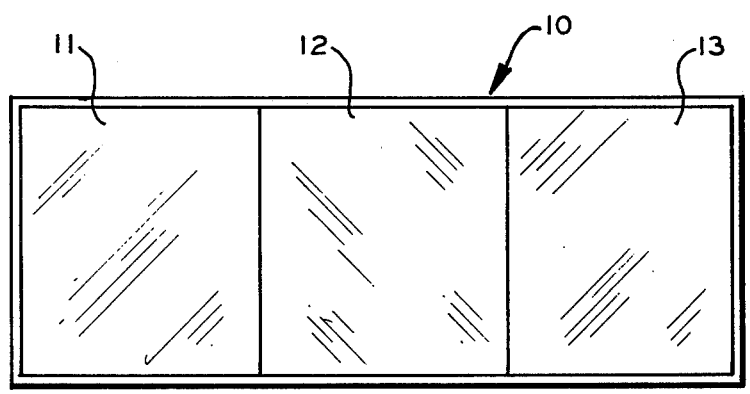
FIG. 1 is a front elevational view of a prior art retroreflector designed to have a wide angle response by using three different sections or panels.
Figure 2:
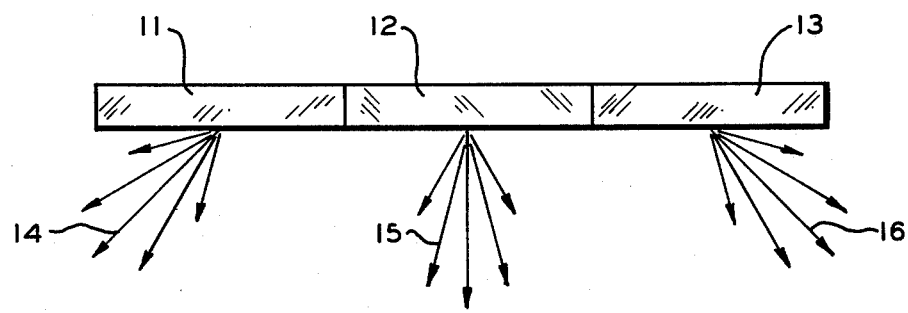
FIG. 2 is a plan view of the retroreflector of FIG. 1 and schematically illustrates how the retroreflector operates to achieve the wide angle response.

FIGS. 1 and 2 illustrate a prior art retroreflector designed to reflect light from a wide range of incident angles. In this instance, the reflector generally represented at 10 consists of three generally coplanar sections 11, 12 and 13. Each section operates independently of the other two and is designed primarily to reflect light approaching from one general direction back along the same general direction. The primary light-reflecting action is different for each section. For example, section 11 is designed primarily to retroreflect light approaching retroreflector 10 from the left as viewed in FIG. 2 and as represented by the arrows 14; section 12 is designed primarily to retroreflect light approaching from directly ahead of retroreflector 10, as represented by the arrows 15; and section 13 is designed primarily to retroreflect light approaching from the right, as represented by the arrows 16. Accordingly, while retroreflector 10 can reflect light throughout a wide angle, corresponding roughly to the angle between arrows 14 and 16, it is approximately only one-third effective at any one time.

The present invention avoids this awkward and inefficient structure by providing a retroreflector which not only reflects light throughout a wide range of entrance angles, but does so substantially throughout its entire retroreflective area.

In general, a present retroreflector has a retroreflective area comprising an array of substantially parallel rows of light-reflecting units. Each row has a plurality of juxtaposed units. Each unit has three mutually perpendicular facets forming a trihedral angle, each angle having three mutually perpendicular edges. Two of the three edges are disposed generally in the direction of the row in which they are contained, while the third edge is disposed generally transversely of that row.

In brief, it is by varying the lengths of the third edge in appreciably adjacent rows, preferably in a repeating pattern for successive rows, that the high reflectivity for a wide range of incident angles substantially throughout the entire array is achieved. The array is, accordingly, an integrated, preferably repeating, pattern of rows of trihedral light-reflecting units of varying configurations.

More particularly, the trihedral angles as used in the present retroreflector may comprise a mixture of rectangular parallelepipeds of varying geometric configurations which differ from row to row; or the trihedral angles may comprise a mixture of the same or different rectangular parallelepipeds with cube corners.

A retroreflector embodying light-reflecting units of rectangular parallelepipeds configuration is disclosed and claimed in my U.S. Pat. No. 4,073,568. Molding pins suitable for forming rectangular parallelepiped light-reflecting units are disclosed and claimed in my U.S. Pat. No. 4,080,280.

If a polyhedron is a solid bounded by planes, and is a prism is a polyhedron of which two faces are congruent polygons in parallel planes, and the other faces are parallelograms having two of their sides in the two parallel planes, a parallelepiped may be broadly defined as a prism whose bases are parallelograms. A right parallelepiped, then, is a parallelepiped with edges perpendicular to the bases. As used here and in the claims, the term "rectangular parallelepiped" means a right parallelepiped whose bases or sides are rectangles. However, some authorities broadly define a rectangle as a parallelogram whose four angles are right angles. This definition generically includes a square as a rectangle. At least two of the three rectangular facets which form a rectangular parallelepiped light-reflecting unit in the present retroreflector cannot be square. Each must be rectangular under the more generally used definition that two adjacent sides or edges of a rectangle are unequal. As used here and in the claims, the term "rectangular parallelepiped" therefore more fully means a right parallelepiped whose facets are rectangles of which at least two adjacent bases or facets are rectangular and each rectangle has unequal sides or edges.

The rectangular parallelepiped herein contemplated may also be regarded as the volume occupied by a six-faceted box, all six facets constituting a right parallelepiped. In the present light-reflecting unit, only three of the facets are actually exposed with at least two facets being rectangular in which two adjacent sides or edges of each of the two rectangular facets are unequal. Preferably, the two rectangular facets of a light-reflecting unit are equal in size or area, and the third facet is a square. The three facets of a light-reflecting unit may also be considered as forming the sides of a trihedral angle.

In a cube corner, sometimes referred to as a triple reflector, the light-reflecting area comprises three square faces which are mutually perpendicular. Since the sides are square and equal in size and thus simulate a cube, such a reflector has come to be called a "cube corner."

In the present retroreflector, the rectangular parallelepipeds, alone or with cube corners, are associated in rows while varying their relative sizes from row to row. This achieves the light response and substantially uniform reflection throughout the retroreflector which are sought in the resulting array.

The configuration of a light-reflecting unit along an appreciable distance in a given row is the same and preferably is the same throughout the row, that is, from the beginning to the end of that row in the array. However, a companion, adjacent row has trihedral, light-reflecting units of a different configuration. As used here and in the claims, the phrase "appreciably adjacent" means rows having differently configured light-reflecting units that are physically sufficiently close to provide the described retroreflection results. Such rows need not be immediately adjacent each other but preferably are. In the preferred form, the light-reflecting units of every row is differently configured from the light-reflecting units of any immediately adjacent row.

Once a pattern of rows is established, each row having a differently configured trihedral, light-reflecting unit, differing mainly in the length of the edge of the trihedral angle that is disposed generally transversely of the rows, the pattern may be repeated throughout the entire retroreflective area, although this is not critical or necessary. A pattern may consist of any two or more rows. The light-reflecting units of different rows of such a pattern may be differently shaped, or there may be some rows having the same configured light-reflecting units. Similarly, a given pattern of rows may itself be part of a larger pattern which is repeated again and again until a retroreflective area of desired size is reached.

In a cube corner trihedral angle, the three facets are equal in size. In the rectangular parallelepiped trihedral angle, the three facets may all be of different or unequal sizes, or two of the facets may be equal in size and the third facet different in size.

In this regard and reverting to the previous description of the third edge of the trihedral angle, the two edges that are disposed generally in the direction of a row may be equal in length. The ratio of the length of one of such two edges to the length of the transversely disposed edge is different for two appreciably adjacent rows and may vary between about 0.5 and about 2. Further, the lengths of the transversely disposed third edges of two appreciably adjacent rows that are different may lie within the range of about 0.025 inch to about 0.125 inch. These values are not critical and are intended only to be exemplary.

As a rule, the corresponding facets of the light-reflecting units of two appreciably adjacent rows may be substantially parallel. In order to avoid blind, non-reflecting areas in the array, the trihedral angles of adjacent rows inter-nest and are offset from each other in a direction along those rows.

Figure 3:
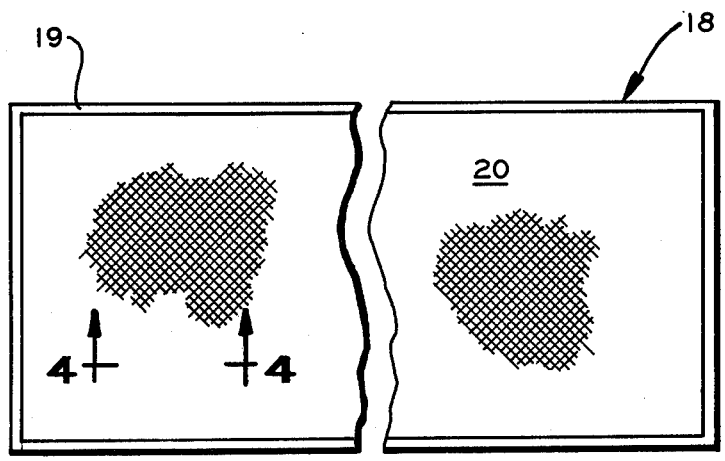
FIG. 3 is a front elevational view like that of FIG. 1 but for a retroreflector of the present invention.
Figure 4:
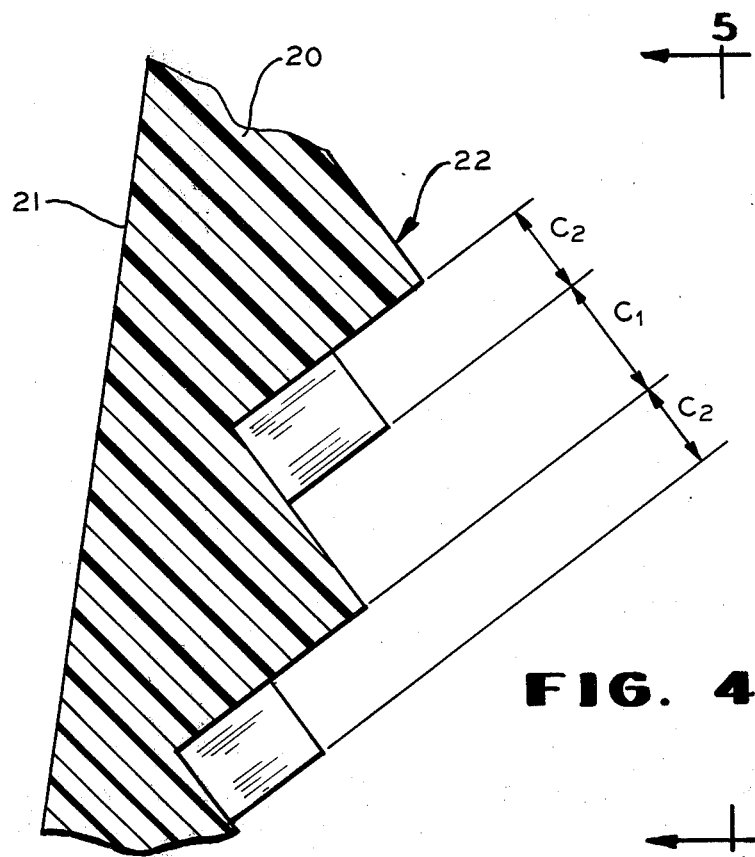
FIG. 4 is an enlarged, fragmentary section of FIG. 3 on the line 4—4 and an offset section of FIG. 5 on the line 4—4.
Figure 5:
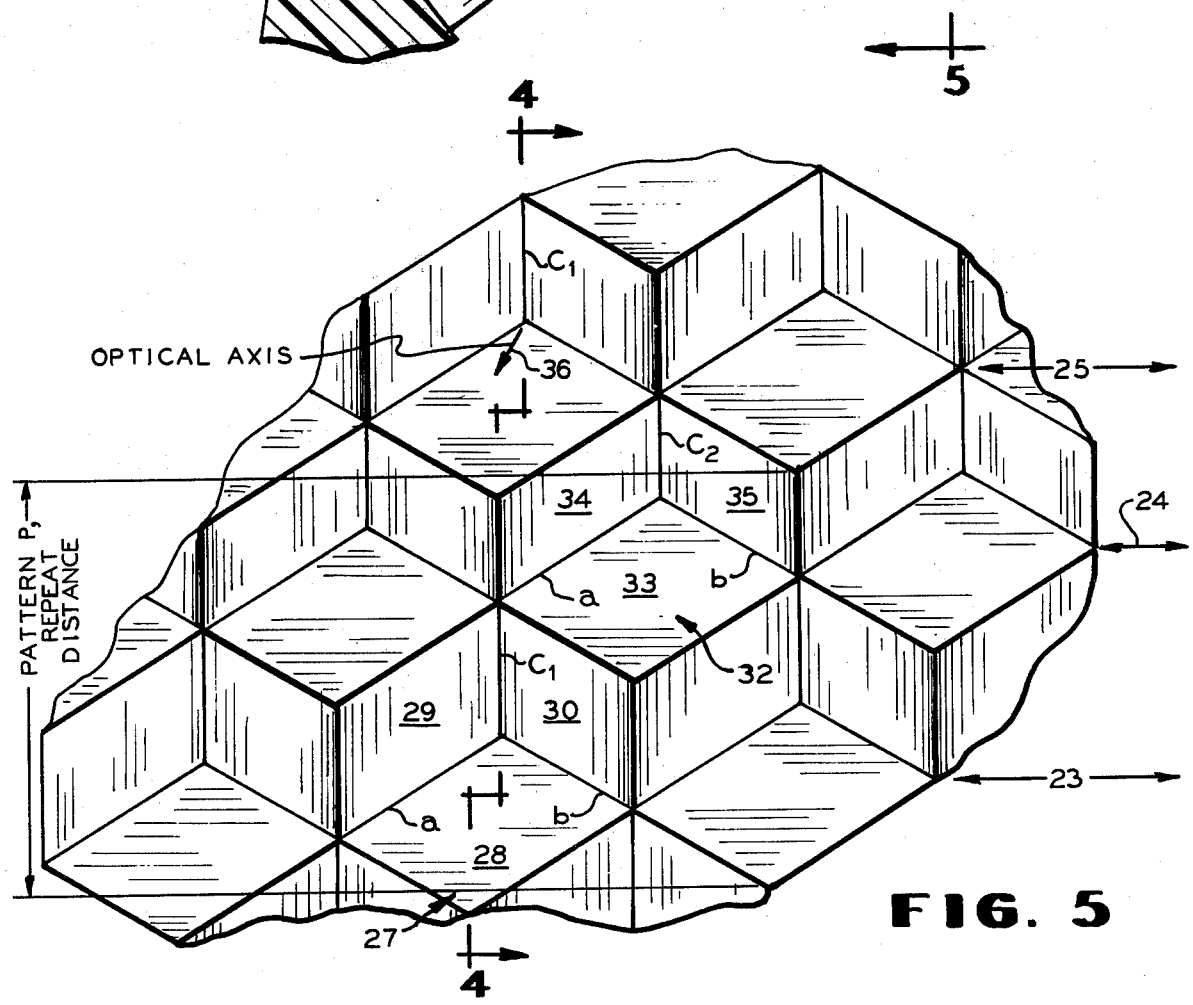
FIG. 5 is a view of FIG. 4 on the plane of the line 5—5.

Referring to the figures, it will be understood that the light-reflective units are shown greatly oversized to facilitate their illustration and description. In FIGS. 3, 4, and 5, a retroreflector of the invention generally represented at 18 includes a rim 19 containing a light-transmitting body such as a sheet 20. The sheet may be fabricated from any durable, light-transmitting, weather-resistant material, such as glass, but preferably is made from synthetic resins such as the polycarbonates and especially from the acrylates like polymethacrylate and polymethylmethacrylate resins. Sheet 20 may also be tinted or pigmented, if desired, to reflect red, yellow or other color.

Sheet 20 has a substantially smooth face 21 (FIG. 4) defining a light-receiving surface and an opposite face having an array, generally indicated at 22 of substantially parallel rows of light-reflecting units extending over an appreciable area of the opposite face. Of array 22, three rows 23, 24 and 25 are indicated in FIG. 5. These rows are generally disposed from left to right as viewed in FIG. 5 and as indicated by the double headed arrows accompanying the reference numerals 23, 24 and 25.

The embodiment of FIGS. 3, 4 and 5 contains a pattern P of only two rows, the pattern distance being indicated by the double headed arrow 26. Thus, rows 23 and 24 have light-reflecting units of different configuration, while row 25 begins a repeat of pattern P and therefore has units like those of row 23. Accordingly, the light-reflecting units of only rows 23 and 24 are discussed in detail.

The trihedral angles of rows 23 and 24 comprise rectangular parallelepipeds in which none of the three facets is equal in size (area) to the other two facets. Further, the three facets of all of the rectangular parallelepipeds of rows 23 and 24 have non-square, rectangular configurations. The light-reflecting units within each row are the same. A light-reflecting unit generally represented at 27 for row 23 comprises facets 28, 29 and 30. A light-reflecting unit generally represented at 32 for row 24 comprises facets 33, 34 and 35. Unit 27 has three mutually perpendicular and intersecting edges a, b and $c_1$. Unit 32 has three mutually perpendicular and intersecting edges a, b and $c_2$. Edges a and b are disposed generally in the direction of rows 23 and 24. Edges $c_1$ and $c_2$ are disposed generally transversely of their respective rows. The two edges a are equal in length, and the two edges b are also equal in length, such that facet 28 is equal in size to facet 33 and the units have one size facet in common. But in this embodiment, edge a is not equal to edge b and, more significantly, edge $c_1$ must not be equal in length to edge $c_2$. This difference between rows 23 and 24, repeated over and over again throughout pattern P, achieves the improved retroreflectivity sought. The optical axes of the units are the diagonals of the rectangular parallelepipeds. For example, one such optical axes is represented at 36 for row 25.

Another characteristic of the type of array shown in FIGS. 4 and 5 is that similar faces of all units of a particular array are parallel, no matter what the individual ratios of c/a or a/b may be. In one specific embodiment like that shown in FIGS. 3 and 4, the indicated letters had the following numerical ratios:

$$a:b:c_1:c_2 = 1\tfrac{1}{4}:1\tfrac{1}{4}:1:\tfrac{3}{4}$$

The remaining figures, FIGS. 6 through 17, are similar to FIGS. 4 and 5 and illustrate still other embodiments which can define the array of light-reflecting units. Light-reflecting units of parallelepipeds can be combined in various ways, either by themselves or with cube corners, to generate a wide variety of reflective arrays. These arrays retain the advantages that parallelepiped units have over angled reflectivity using cube corners alone, such as no occlusion by a staggered step arrangement and the ability of molding directly from forming pins.

Figure 6:
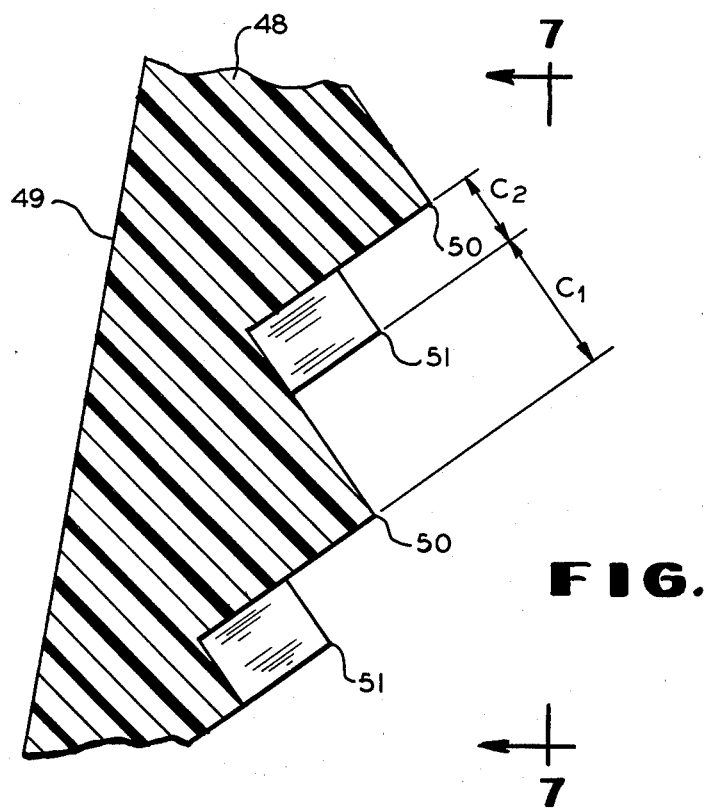
FIGS. 6, 8, 10, 12, 14 and 16 are enlarged fragmentary sections, similar to FIG. 4, of still other embodiments of the present invention taken on the lines 6—6, 8—8, 10—10, 12—12, 14—14 and 16—16, respectively, of FIGS. 7, 9, 11, 13, 14, and 17.
Figure 7:
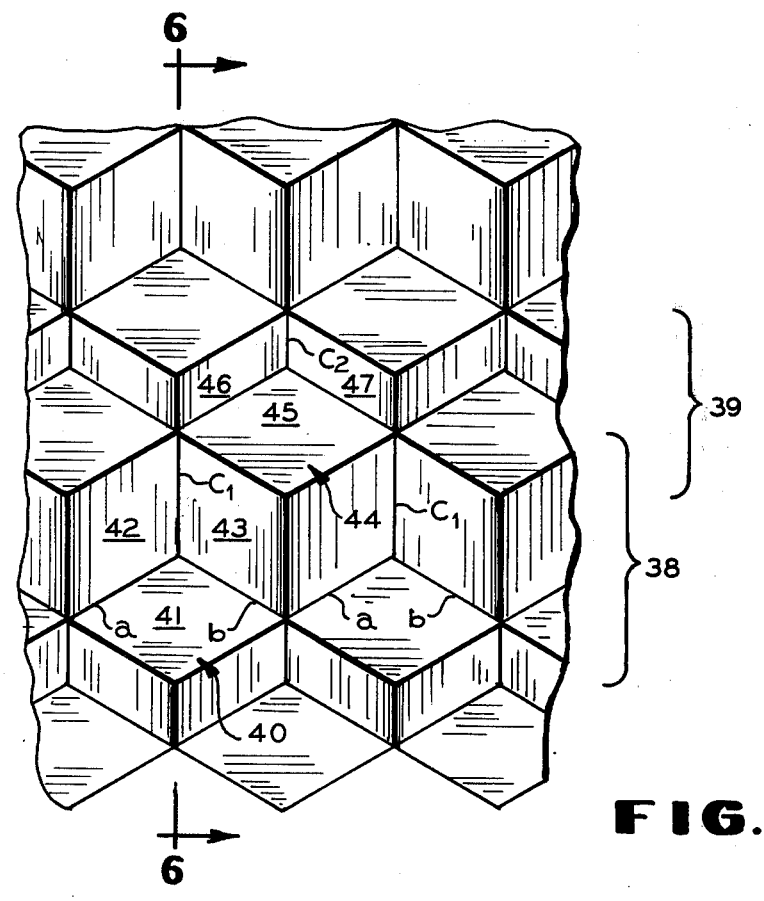
FIGS. 7, 9, 11, 13, 15 and 17 are views of FIGS. 6, 8, 10, 12, 14 and 16, respectively, taken on the planes of the lines 7—7, 9—9, 11—11, 13—13, 15—15, and 17—17.

In the embodiment of FIGS. 6 and 7, a repeating pattern consists of two immediately adjacent rows, one row 38 having cube corner light-reflecting units, and the other row 39 having rectangular parallelepiped light-reflecting units. These two rows alternate in filling out a repeating pattern. The light-reflecting units are the same within a given row. A unit 40 of row 38 comprises facets 41, 42, and 43 and mutually perpendicular edges a, b, and $c_1$. For ease of comparison and illustration, the intercepting edges of all units of all embodiments are indicated by the same corresponding letters a, b and c, the different values for c for a given embodiment being indicated by subscripts. But it will be appreciated that these letters may have different values for different embodiments. A unit 44 of row 39 comprises facets 45, 46, and 47 and mutually perpendicular edges a, b and $c_2$. As before, a=a and b=b of the two rows, 38 and 39. Also since unit 40 is a cube corner, a=b=$c_1$. However, $c_1$ and $c_2$ are different in length and not equal to each other.

In the embodiment of FIGS. 6 and 7, the cube corner axis and the axis of a pin used to form the illustrated light-reflecting unit can be aligned as is the case in all of the embodiments, although they need not be. However, if such axes are aligned, then pins of regular hexagonal cross-section can be used as the basic forming tool, with parallelepiped light-reflecting units of row 39 formed by machining back two adjacent pin faces, keeping the angles between the faces at about 120°. In one specific embodiment of FIGS. 6 and 7, the ratio of $c_1/a$ was 1.0 and the ratio of $c_2/a$ was 0.5. The view of FIG. 7 is taken along the cube axis direction showing how the light-reflecting units stack together. FIG. 6 is taken in a plane parallel to the cube axis. In this regard, it will be noted that FIGS. 4 and 6 are slanted somewhat in a clockwise direction. This is for the purpose of portraying an accurate projection in FIGS. 5 and 7, respectively, along lines 5—5 and 7—7 and has no other significance. As a general rule, if true projections are drawn, the lengths of the c edges appear at their true values in the sectional news on the left of the drainings.

FIGS. 6 and 7 further illustrate a desirable feature which preferably is present in this and other embodiments. A retroreflector 48 has a light receiving surface 49 from which projecting points formed by the units of the array are equally distant. Thus, rearwardly projecting points 50 left by the rectangular parallelepipeds are equally distant from face 49 as are rearwardly projecting points 51 left by the cube corners. By making the front, refracting surface 49 parallel to a plane passing through points 50 or through points 51, the reflector thickness is uniform and the light-reflecting units are tilted away from a normal to surface 49.

In one specific embodiment corresponding to that of FIGS. 6 and 7, the cube corner axes made an angle of 8.05° from the normal, and the rectangular parallelepiped axes made an angle of 23.84° with the normal. Thus at the exterior angle corresponding to the 8.05° internal angle, the cube corner units were fully reflective, and the rectangular parallelepiped units partially effective. At an external angle corresponding to 23.84° internal angle, the parallelepiped units were fully reflective, and the cube corner units were partially reflective.

Other arrangements can be used employing the same basic arrangement of rows 38 and 39, but with different angles between the optical axes and a normal to the light-receiving surface. Each of such other arrangements has a different angular response. In a further modification, such arrays can be used in sections, each section having its optical axes pointing in a different azimuthal direction, so that the overall response has a symmetry required for a particular application.

Figure 8:
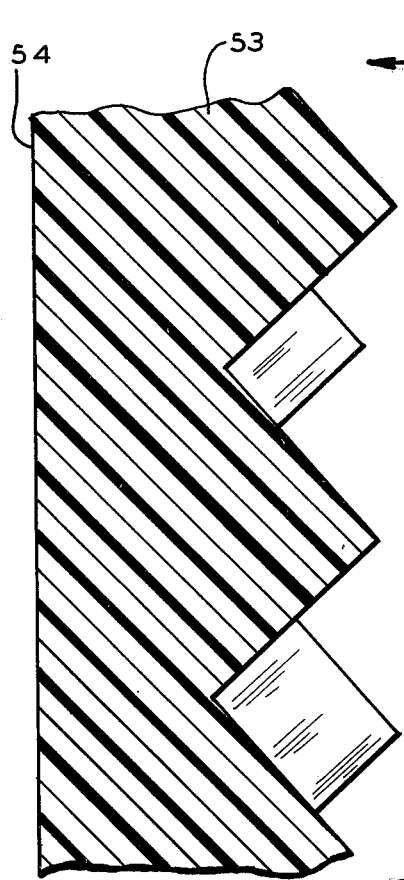
Figure 9:
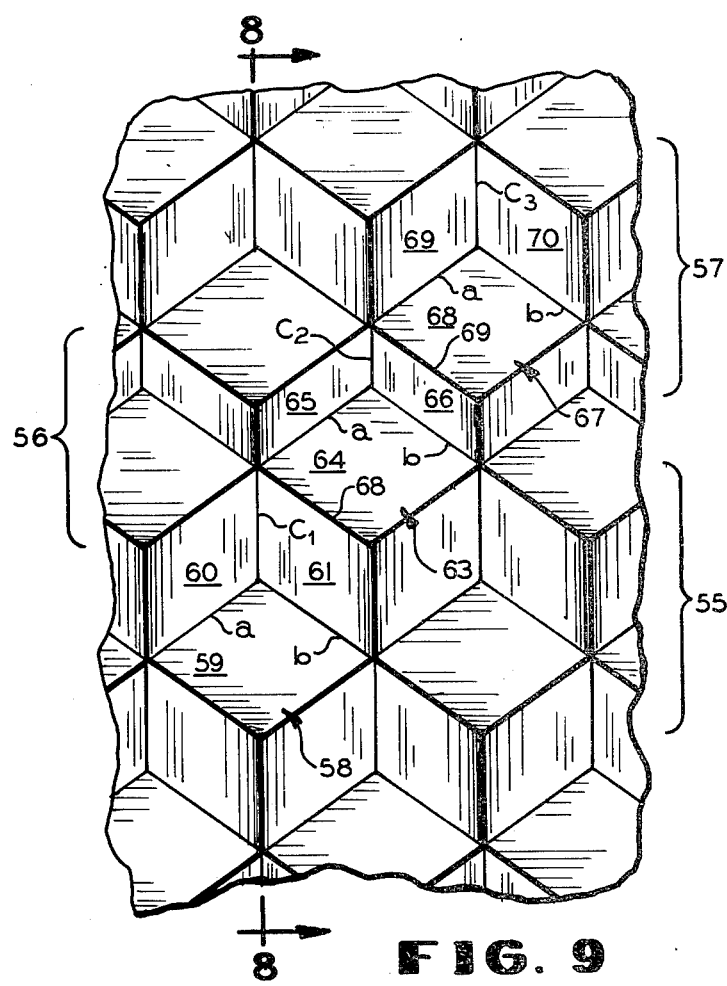

In the embodiment of FIGS. 8 and 9, a retroreflector 53 has a light-receiving surface 54 and an array consisting of a repeating pattern of three rows 55, 56 and 57. All rows embody rectangular parallelepiped light-reflecting units but of different configurations from row to row. A unit 58 of row 55 comprises facets 59, 60 and 61 and mutually perpendicular edges a, b, and $c_1$. A unit 63 of row 56 comprises facets 64, 65 and 66 and mutually perpendicular edges a, b, and $c_2$. A unit 67 of row 57 comprises facets 68,69 and 70 and mutually perpendicular edges a,b and $c_3$. In each of the three rows, the edges a are equal in length to each other, and edges b are equal in length to each other. But edges $c_1$, $c_2$, and $c_3$ are all different in length. A rectangular parallelepiped unit normally has one square facet and two rectangular (non-square) facets. But a rectangular parallelepiped can have three rectangular (non-square) facets as illustrated in FIGS. 4 and 5. In the instance where a rectangular parallelepiped unit has one square facet, all of the optical axes, which are body diagonals of the parallelepiped geometric configuration, lie in parallel planes.

The three row pattern of FIGS. 8 and 9 illustrates how the rows inter-nest in a stepwise, zigzag, or offset manner in a direction along the rows since, as indicated, the lengths of the corresponding a and b edges are the same. This does not mean that edge a need equal edge b. Thus, facet 61 in row 55 and facet 64 in row 56 intersect at edge 68, facet 64 being somewhat to the right of facet 61 as viewed in FIG. 9; facet 64 of row 56 intersects facet 66 at edge b of that row, facet 66 being somewhat to the right of facet 64 as viewed in FIG. 9; and facet 66 of row 56 and facet 68 of row 57 intersect at edge 69, facet 68 being somewhat to the right of facet 66 as viewed in FIG. 9. When rows inter-nest as described, there are no blind or occluded areas in the retroreflective array.

Figure 10:
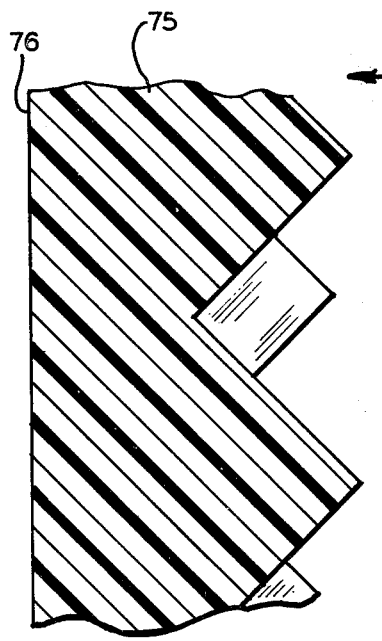
Figure 11:
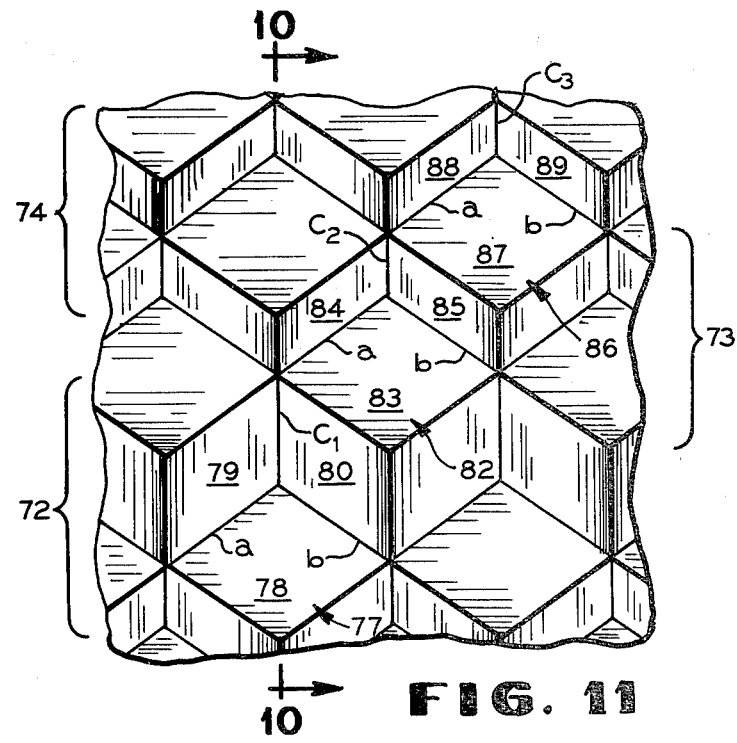

The embodiment of FIGS. 10 and 11 includes another pattern of three rows. The portion of the pattern shown includes three rows 72, 73 and 74 of a retroreflector 75 having a light-receiving surface 76. Row 72 embodies trihedral, light-reflecting units that are cube corners. Rows 73 and 74 embody units that are rectangular parallelepipeds. A unit 77 of row 72 comprises facets 78,79 and 80 and mutually perpendicularly edges a,b, and $c_1$. A unit 82 of row 73 comprises facets 83, 84 and 85 and mutually perpendicular edges a, b, and $c_2$. A unit 86 of row 74 comprises facets 87, 88 and 89 and mutually perpendicular edges a,b, and $c_3$. In each row, edges a are equal and edges b are equal in length. Moreover, because of the cube corner configuration in row 72, edges a and b of that row are also equal to each other. However, edges $c_1$, $c_2$ and $c_3$ are all different in length in accordance with the present invention.

Figures 12, 13:
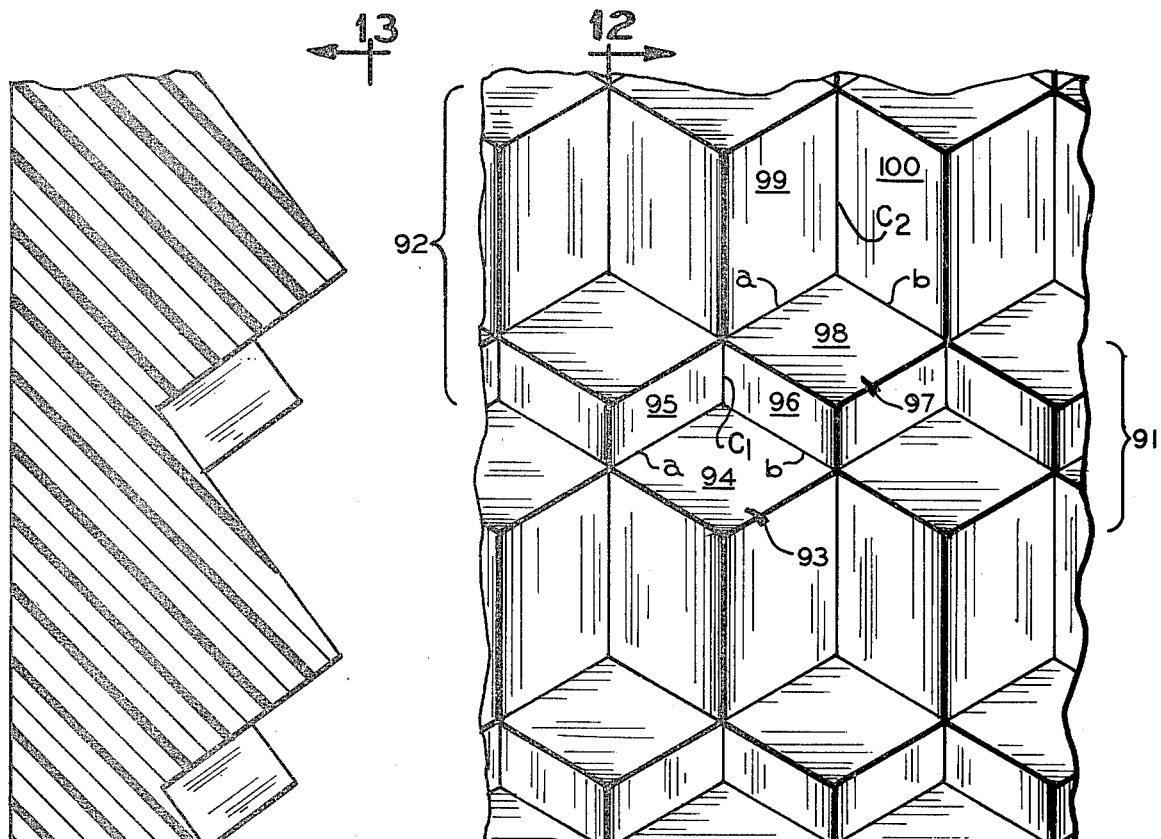

The embodiment of FIGS. 12 and 13 shows an alternate pattern of two rows 91 and 92 which embody light-reflecting units that are rectangular parallelepipeds of appreciably differing values for the transversely disposed edge c. A unit 93 of row 91 comprises facets 94, 95 and 96 and mutually perpendicularly edges a, b and $c_1$. A unit 97 of row 92 comprises facets 98, 99 and 100 and mutually perpendicular edges a, b and $c_2$. In each row, edges a are equal in length and edges b are equal in length. Also, in this instance, even though units of rectangular parallelepipeds are used, edges a of each row are equal in length to edges b. Edges $c_1$, and $c_2$ vary appreciably in length.

Figures 14, 15:
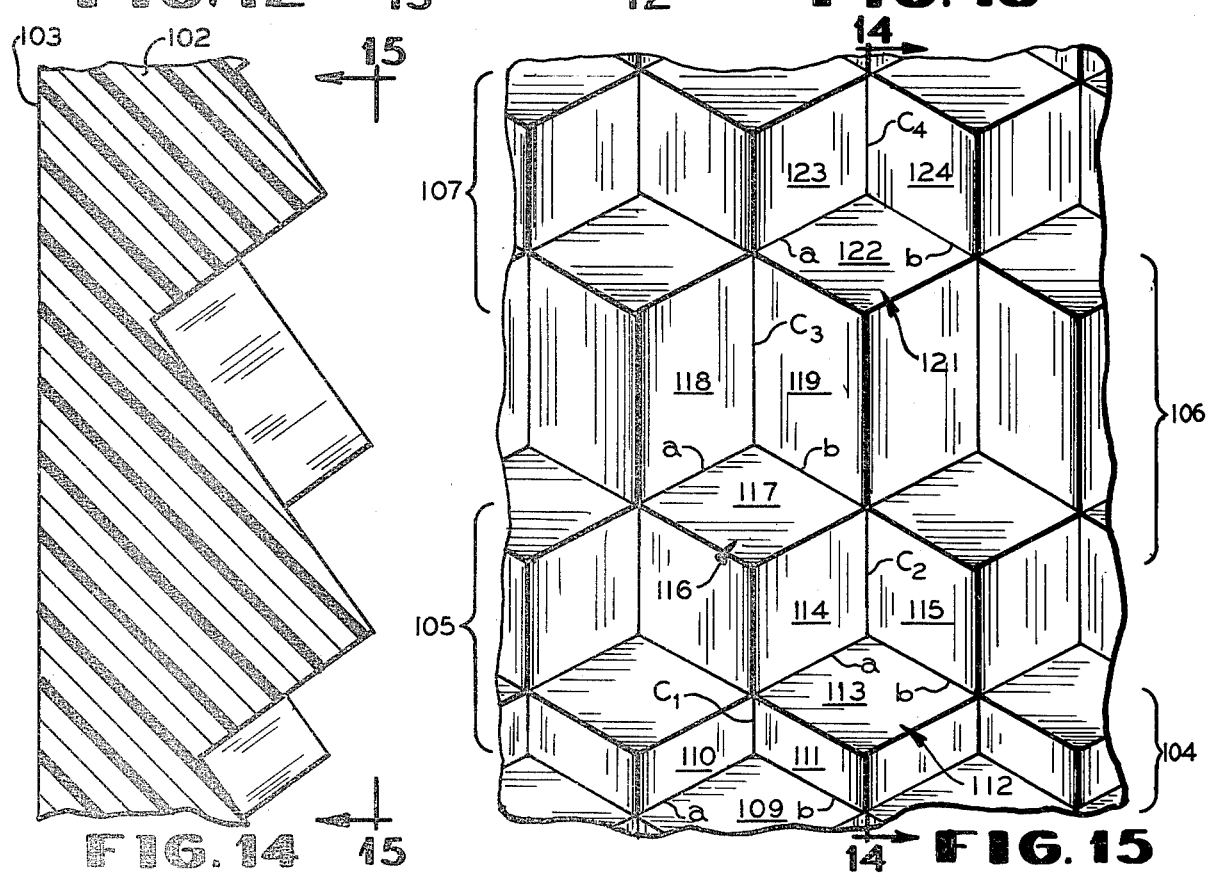

The embodiment of FIGS. 14 and 15 show a quadruple pattern of four rows in which two rows of cube corner light-reflecting units are interspersed with two rows of rectangular parallelepiped light-reflecting units. A retroreflector 102 has a light-receiving surface 103 and an array on the opposite face comprising a repeating pattern of four rows 104, 105, 106 and 107. Rows 104 and 106 embody light-reflecting units that are rectangular parallelepipeds of differing configurations. Rows 105 and 107 embody light-reflecting units that are cube corners of equal dimensions. A unit 108 of row 104 comprises facets 109, 110, and 111 and mutually perpendicular edges a, b and $c_1$. A unit 112 of row 105 comprises facets 113, 114 and 115 and mutually perpendicular edges a, b and $c_2$. A unit 116 of row 106 comprises facets 117, 118, and 119 and mutually perpendicular edges a, b, and $c_3$. A unit 121 of row 107 comprises facets 122, 123, and 124 and mutually perpendicular edges a, b, and $c_4$. In each row, edges a are equal in length and edges b are equal in length. Moreover, because of the cube-corner configurations in rows 105 and 107, edges a and b of each row are also equal to each other. However, edges $c_1$, $c_2$, $c_3$, and $c_4$ are all different in length in accordance with the present invention.

Figures 16, 17:
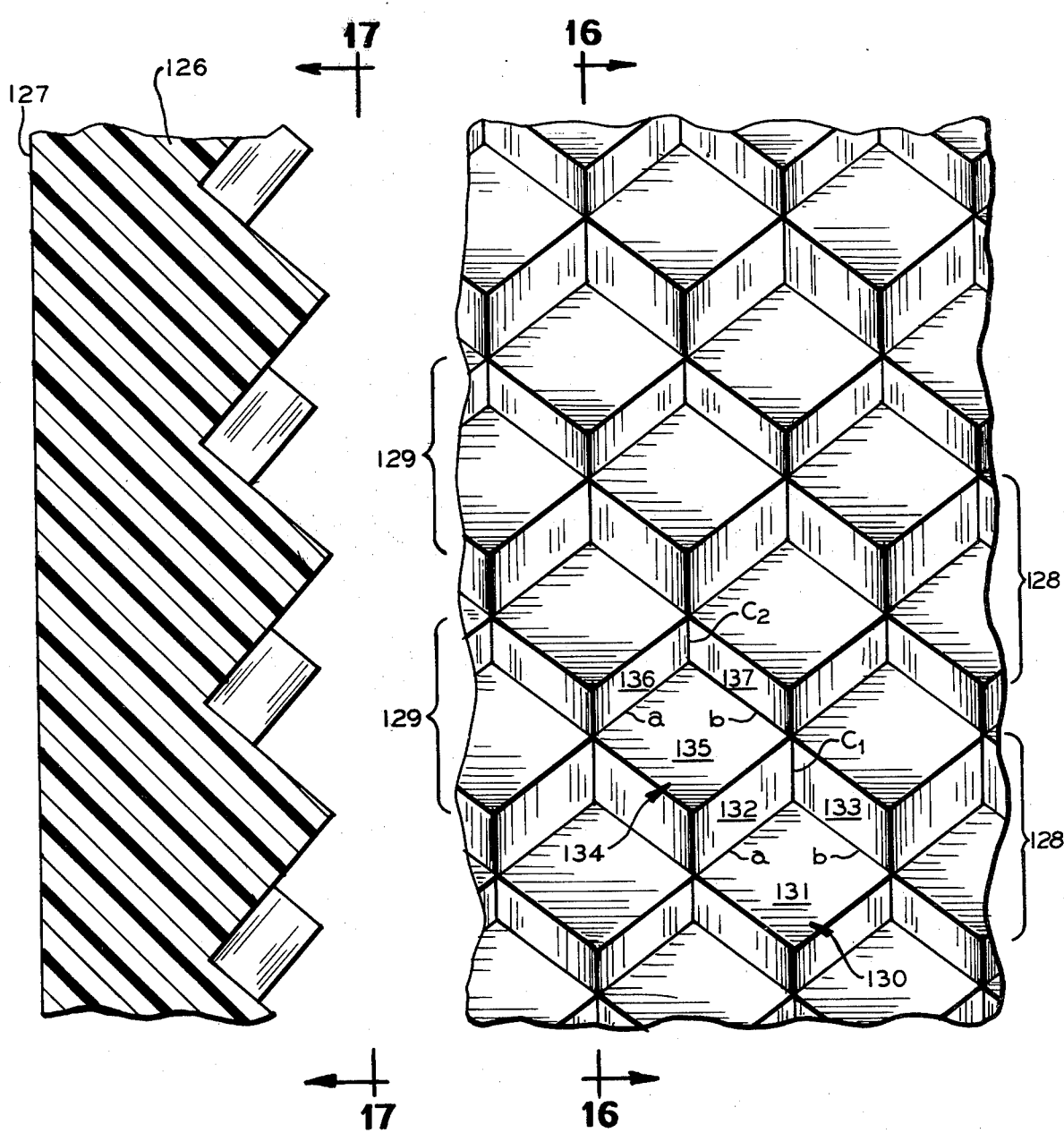

The embodiment of FIGS. 16 and 17 illustrates a relatively large expanse of an alternating two row pattern, each row embodying light-reflecting units of rectangular parallelepipeds. A retroreflector 126 has a light-receiving surface 127 and an array on the opposite face comprising a repeating pattern of two rows 128 and 129. A unit 130 of row 128 comprising facets 131, 132, and 133 and mutually perpendicular edges a, b, and $c_1$. A unit of 134 of row 129 comprises facets 135, 136, and 137 and mutually perpendicular edges a, b and $c_2$. In each row edges a are equal in length and edges b are equal in length. Also, in this particular embodiment, edges a are equal in length to edges b. Edges $c_1$, and $c_2$ have different lengths. The other rows indicated in FIGS. 16 and 17 repeat the pattern of rows 128 and 129, but if desired, each row could have a different value for the edge corresponding to edge c.

The described light-reflecting array may be fabricated from pins having a tri-faceted and corresponding to the shape of the trihedral, light-reflecting unit desired in the array. In practice, a number of pins are bound together in a side-by-side fashion to form a bundle. Normally, the bundle comprises several rows of pins, one row being superimposed over the other. Preferably, the pins and rows of pins are longitudinally positioned with respect to each other to expose only the forming ends of the pins. This arrangement is preferred and possible with the present retroreflective array, because every exposed surface at the forming end of the pin forms a surface in a reflector that is reflecting and no others. As a result, there are no shadows or blank areas which are non-reflecting and which can materially reduce the retroreflection and intensity of a reflector.

There are in general two techniques by which one or more bundles of pins ar used to form a reflector. These include either molding directly about the forming ends of bundles of pins, or by producing from the bundles an intermediate electroform from which a reflector is molded.

In each molding process, the pins are suitably bound to one another at their common ends remote from the forming ends. This can be accomplished by clamping or welding or brazing the ends together. In a direct molding operation, a bundle of pins is mounted in the wall of a die cavity such the forming ends are disposed within the cavity. The mold receives moldable material to fill the cavity, usually thermoplastic material such as a transparent synthetic thermoplastic material like polymethylmethacrylacte. Upon solidifying, the material has the general outline of the mold and a plurality of light-reflecting areas left by the forming ends of the pins. Examples of this type of molding are described in U.S. Pat. Nos. 1,591,572 to Stimson; 1,906,655 to Stimson; and 3,443,281 to Walby.

In the electroform process, a pin bundle acts as a master pattern for an electroplating process. Since the pins are electrically conductive, they can be connected as the cathode and placed in a solution within a plating tank. Direct current passes through the anode, which may consist, for example, of a nickel alloy. The anode metal dissolves in the solution of the plating tank and deposits on the cathodic pin bundle. The electroplating is against the forming ends of the pins of the bundle, so that a reverse of their forming surfaces is produced.

Following the electrodeposit, the resulting electroplated insert is unitary and possesses an imprint pattern left by the pin bundle. Instead of electrodepositing metal, metal vapor deposition can be used. After being stripped from the pin bundle, the electro-formed insert is used to mold a reflector in lieu of the original pin bundle by shaping a mass of moldable material onto the formed surface of the insert, such as by injection molding. Examples of this type of molding operation are described in U.S. Pat. Nos. 3,632,695 to Howell and 3,811,647 to Pink. The patents herein mentioned are hereby incorporated by reference.

None of the light-reflecting units has reentrance surfaces and therefore are easily molded. A projection of an array of light-reflecting units forms a like array of hexagons filling the projection plane. Accordingly, tools for forming molds to shape the reflecting surfaces can be made from pins of hexagonal cross-section having the desired tri-faceted ends.

The retroreflector in sheet or other form can be used as illustrated in FIG. 3 or as part of any support, such as a road sign, road marker, or the like, from which retroreflection of light is desired.

To aid in their reflecting function, the light-reflecting units may be coated with metal or metallized in a manner known in the art to form a metallic layer lying over such units. Aluminum is the preferred metal for this purpose. In the figures, this metallization has not been shown to facilitate illustration of the structure of the retroreflector and its light-reflecting units.

Although the foregoing describes several embodiments of the present invention, it is understood that the invention may be practiced in still other forms within the scope of the following claims.

I claim:

1. A retroreflector having a wide angle response comprising a light-transmitting body having a substantially smooth face defining a light-receiving surface and an opposite face having an array of substantially parallel rows of light-reflecting units extending over an appreciable area of said opposite face, each row comprising a plurality of juxtaposed light-reflecting units, each unit being formed from three mutually perpendicular facets forming a trihedral angle, each trihedral angle having three mutually perpendicular edges, two of said edges being disposed generally in the direction of a row and the third edge being disposed generally transversely of the direction of said row, the trihedral angles of the light-reflecting units of at least two appreciably adjacent rows having the same corresponding lengths for said two edges disposed generally in the direction of a row but differing lengths for said edge disposed generally transversely of the row.

2. The retroreflector of claim 1 in which said two edges disposed generally in the direction of a row are equal in length, and the ratio of the length of one of said two edges to the length of said transversely disposed third edge is different for said two adjacent rows and varies between about 0.5 and about 2.

3. The retroreflector of claim 1 in which the lengths of said transversely disposed third edges of said two adjacent rows are different but lie within the range of about 0.025 inch to about 0.125 inch.

4. The retroreflector of claim 1 in which the pattern created by said two adjacent rows is repeated throughout a substantial portion of said array, all the said rows inter-nesting in side-by-side relation.

5. A retroreflector having an integrated, light-reflecting construction throughout its retroreflective area, said retroreflector comprising a light-transmitting sheet member having a substantially smooth face defining a light-receiving and light-refracting surface and an opposite face having an array of substantially parallel rows of light-reflecting units extending over an appreciable area of said opposite face, each row comprising a plurality of juxtaposed light-reflecting units, each unit being formed from three mutually perpendicular facets forming a trihedral angle, each trihedral angle having three mutually perpendicular and intersecting edges a, b, and c, edges a and b being disposed generally in the direction of a row and edge c being disposed generally transversely of said row, the trihedral angles of the light-reflecting units of at least two appreciably adjacent rows having the same corresponding lengths for edges a and b, respectively, but different lengths for edge c.

6. The retroreflector of claim 5 of which edges a and b have different lengths.

7. The retroreflector of claim 5 in which edges a and b are equal in length.

8. The retroreflector of claim 5 in which edges a and b are equal in length, the ratio of the length of edge c to the length of edge a being about 1.0 for one of said rows, and the ratio of the length of edge c to the length of edge a being about 0.5 for the other of said rows.

9. The retroreflector of claim 5 in which three immediately inter-nesting rows of said array have the same corresponding lengths for edges a and b and share said edges with a juxtaposed row, each of said three adjacent rows having a different length for edge c.

10. The retroreflector of claim 9 in which the pattern created by said three adjacent rows, including the order of the variance of the length of edge c, is repeated throughout a substantial portion of said array.

11. The retroreflector of claim 9 in which the pattern of said three adjacent rows is repeated throughout a substantial portion of said array, the order of the lengths for edges c being different in any two adjacent patterns of said three adjacent rows.

12. The retroreflector of claim 5 in which the corresponding facets of said light-reflecting units of said two adjacent rows are substantially parallel.

13. The retroreflector of claim 5 in which the trihedral angles of adjacent rows inter-nest and are offset from each other in a direction along said rows.

14. The retroreflector of claim 5 in which the trihedral angles of one of said two rows comprise cube corners, and the trihedral angles of the other of said rows comprise rectangular parallelepipeds.

15. The retroreflector of claim 5 in which said smooth light-receiving face is evenly spaced from corresponding points along said array of rows.

16. A process for preparing a retroreflector having a wide angle response, comprising forming on one side of a light-transmitting sheet member an array of substantially parallel rows of juxtaposed light-reflecting units, forming each unit as three mutually perpendicular facets defining a trihedral angle having three mutually perpendicular and intersecting edges, disposing two of said edges of each unit generally in the direction of a row and disposing the third edge generally transversely of the direction of said row, providing the trihedral angles of the light-reflecting units of at least two appreciably adjacent rows with the same lengths, respectively, for said two edges disposed generally in the direction of said rows, and providing a different length for said edges of said two rows disposed generally transversely of said rows.

17. The process of claim 16 in which each trihedral angle has three mutually perpendicular and intersecting edges a, b, and c, edges a and b being those edges disposed generally in the direction of a row, and edge c being that edge disposed generally transversely of said row, and the trihedral angles of the light-reflecting units of at least two appreciably adjacent rows have the same corresponding lengths for edges a and b, respectively, but different lengths for edge c.

18. The process of claim 16 in which the trihedral angles of a given row are the same and comprise either cube corners or rectangular parallelepipeds, provided that no two adjacent rows both contain cube corners, and provided that when two adjacent rows both contain rectangle parallelepipeds, said parallelepipeds have differing lengths for said transversely disposed edge.

19. A retroreflector having an integrated, light-reflecting construction throughout its retroreflective area, said retroreflector comprising a light-transmitting sheet member having a substantially smooth face defining a light-receiving and light-refracting surface and an opposite face having an array of substantially parallel rows of light-reflecting units extending over an appreciable area of said opposite face, each row comprising a plurality of juxtaposed light-reflecting units, each unit being formed from three mutually perpendicular facets forming a trihedral angle, each trihedral angle having three mutually perpendicular and intersecting edges a, b, and c, edges a and b being disposed generally in the direction of a row and edge c being disposed generally transversely of said row, the trihedral angles of the light-reflecting units of at least two appreciably adjacent rows having the same corresponding lengths for edges a and b, respectively, but different lengths for edge c, the trihedral angles of a given row being the same and comprising either cube corners or rectangular parallelepipeds, provided that no two adjacent rows both contain cube corners, and provided that when two adjacent rows both contain rectangular parallelepipeds said parallelepipeds have differing lengths for edge c.

* * * * *